(12) United States Patent
Sheng et al.

(10) Patent No.: US 6,788,559 B2
(45) Date of Patent: Sep. 7, 2004

(54) METHOD OF SWITCHING SYNCHRONIZATION OF PARALLEL-CONNECTED CONVERTER SYSTEM

(75) Inventors: Xiaojun Sheng, Shenzhen (CN); Dangsheng Zhou, Shenzhen (CN)

(73) Assignee: Emerson Network Power Co., Ltd., Shenzhen (CN)

( * ) Notice: Subject to any disclaimer, the term of this patent is extended or adjusted under 35 U.S.C. 154(b) by 0 days.

(21) Appl. No.: 10/335,231

(22) Filed: Dec. 30, 2002

(65) Prior Publication Data

US 2003/0137856 A1 Jul. 24, 2003

(30) Foreign Application Priority Data

Dec. 31, 2001 (CN) ........................................ 01130178 A (51) Int. Cl.[7] .............................................. H02M 7/48
(52) U.S. Cl. ...................................................... 363/72
(58) Field of Search ............................. 363/65, 71, 72; 307/82

(56) References Cited

U.S. PATENT DOCUMENTS

| | | | |
|---|---|---|---|
| 4,886,981 A | 12/1989 | Lentini et al. | ................ 307/87 |
| 5,193,054 A | 3/1993 | Galloway et al. | ............. 363/72 |
| 6,169,679 B1 | 1/2001 | Deng et al. | .................... 363/72 |
| 6,396,720 B1 | 5/2002 | Gronbach | ..................... 363/72 |
| 6,466,469 B1 | 10/2002 | Caruthers et al. | ............. 363/72 |
| 6,483,729 B2 | 11/2002 | Messager | ..................... 363/72 |

*Primary Examiner*—Adolf Berhane
(74) *Attorney, Agent, or Firm*—Ladas & Parry (57) ABSTRACT

The present invention relates to a switching synchronization method of parallel converter system, wherein one of converters is the host and the others are slave converters. The host converter includes a first timer and a pulse-transmitting device, and the slave converter includes a second timer, pulse capture device, and a synchronization adjustment. At a fixed time Tk1, the host converter sends a synchronization pulse to the synchronization bus through the pulse-transmitting device; and in the slave converter the second timer records the time Tx of the edge of the synchronization pulse received by the pulse capture device from the synchronization bus. The synchronization adjuster adjusts the second timer of the slave converter so as to synchronize it with the first timer of the host converter in accordance with the relationship between the times Tk1 and Tx; and then according to a predetermined protocol, the switching carrier timer of the slave converter so as to be adjusted to synchronize with the switching carrier timer of the host converter.

17 Claims, 5 Drawing Sheets

METHOD OF SWITCHING SYNCHRONIZATION OF PARALLEL-CONNECTED CONVERTER SYSTEM

FIELD OF THE INVENTION

The present invention relates to a parallel-connected converter system, and more particular relates to a method of maintaining synchronized switching of the parallel converter system of multiple parallel-connected converters in various working conditions.

BACKGROUND OF THE INVENTION

At present, the parallel-connected converters are commonly used. In the present parallel converter system, the following methods are used to control the switching of the multiple converters.

Figure 1:
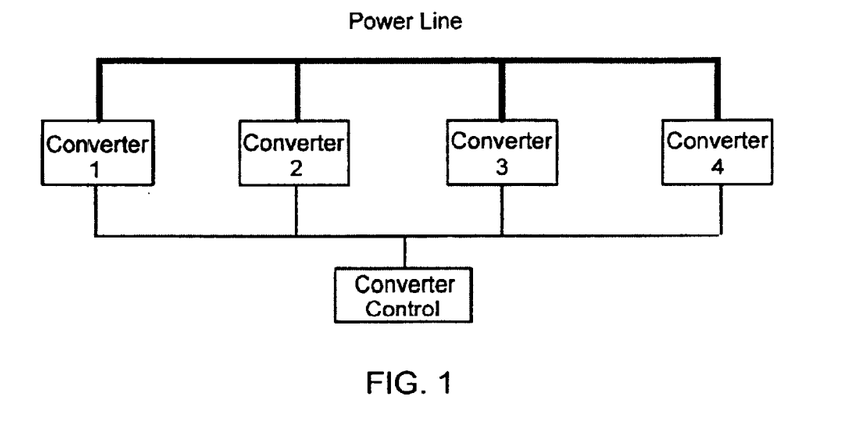
FIG. 1 is an illustrative diagram of centralized control of parallel-connected converters in the prior art.
Figure 2:
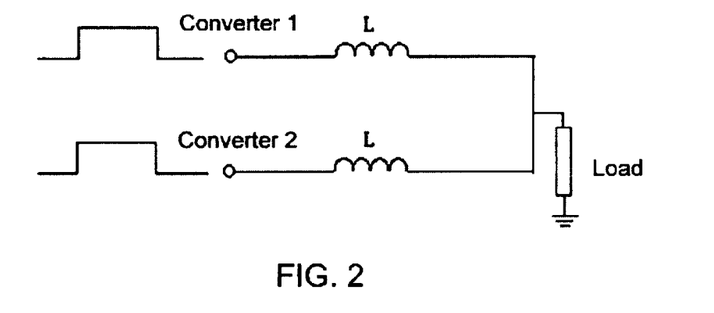
FIG. 2 is an illustration of two converters working under the same control signal using centralized control in the prior art.

The first method is to use centralized control of the parallel-connected converters. As shown in FIG. 1, the parallel-connected converters are controlled by a common controller such that the switching of the converters is completely the same so as to overcome the high-frequency circulating current among the parallel-connected converters. As seen in FIG. 2, a common controller controls two parallel-connected converters such that the driving waveforms of the bridge legs of every converter are the same, and the voltage waveforms applied on the filtering inductors are the same. Therefore, no high-frequency circulating current exists between the filtering inductance of the converters. However, this method has a few defects such as nonflexible control, long control cables, and sensitive to interference, and thus this method is used only on the modular parallel converters, while it is not adopted in large parallel-connected power converters.

Figure 3A:
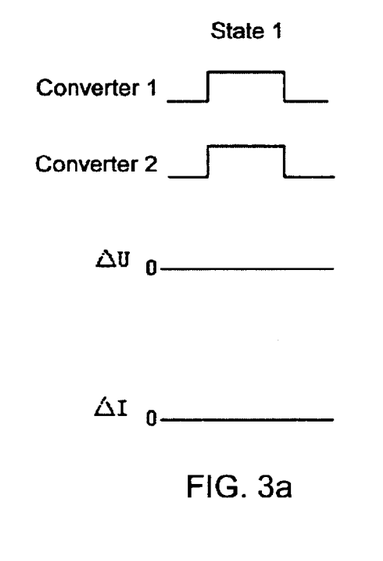
FIGS. 3a and 3b are illustrations of the two basic working states of two converters, respectively, under two different control signals using separate control method in the prior art.
Figure 3B:
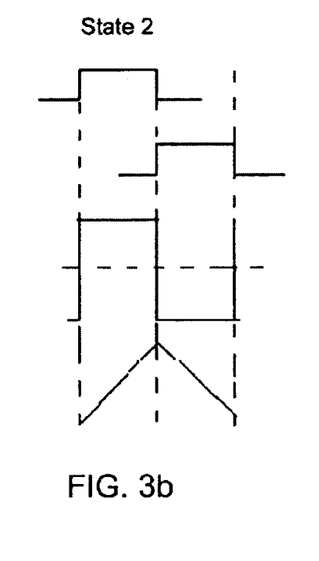

The second method is to control the parallel-connected converters separately. The switching frequency is constant, and it does not handle the high frequency circulating current. The switching patterns among such converters slides between two states of FIG. 3. In state 1 of FIG. 3, the high frequency voltage difference between the converters is zero when the switching waveforms of different converters are completely synchronized. Thus, there is no high frequency circulating current. In state 2 of FIG. 3, the high frequency voltage difference between the converters is the biggest when the switching waveforms of different converters are completely reversed. Thus, the high frequency circulating current is the biggest. The sliding frequency between these two states depends on the accuracy of the crystal-vibration, and it normally needs a few seconds to complete a sliding cycle. The disadvantage of this method is that the circulating current varies during a period of time, and in the aforesaid state 2 the circulating current is very big that would result in high ripple on the output voltage, and it varies. Thus, the filter capacitor current is big so as to cause overheating easily.

The third method is to use separate control for the parallel-connected converters, while the switching frequency is under variable frequency control. At present, this is the primary method used in the industry. That is to say the switching frequency of each converter keeps on changing such that during the period of the utility frequency most of the outputs of the converters are between the two states of FIG. 3. This, in fact, averages the high frequency circulating currents under the state 1 and state 2 of FIG. 3, and the amount of the circulating current depends on the filter inductance of the converters. The disadvantage of this method is the large variation of the switching frequency, and this may cause difficulty for the control of the converter. And the relatively big high frequency circulating current still exists.

SUMMARY OF THE INVENTION

The technical problem for the present invention to solve is to provide a method of switching synchronization of parallel-connected converter system. In the condition of digitized separate control and substantially constant switching frequency, the synchronized switching frequency is realized among the parallel-connected converters. The reduction of the high frequency circulating current among the converters may facilitate the realization of reliable parallel connection.

The technical embodiment of the present invention is to provide a method of switching synchronization of the parallel-connected converter system, characterized by setting one of the converters as the host converter, setting other remaining converters as slave converters. The host converter contains at least a first timer and a pulse-generating device, and the slave converter contains at least a second timer, a pulse-edge capture device, and a synchronization adjuster. The converters are connected through a synchronizing signal bus. The converter system is synchronized in accordance with the following steps.

The first timer of the host converter is used to send synchronization pulses toward the synchronizing bus through the pulse-generating device at a predetermined time Tk1.

The second timers of the slave converters record the time Tx of the edge of the synchronization pulses received by the pulse capture device from the synchronization bus.

The synchronization adjuster carries out the synchronization algorithm based on TK1 and Tx, adjusts the second timers of the slave converters to be synchronized with the first timer of the host converter. And then according to the predetermined protocol, the switching carrier timers of the slave converters are adjusted to synchronize with the switching carrier timer of the host converter.

In accordance with the method of the present invention, the first timer of the host converter also functions as the switching carrier timer when there is only one timer in each converter, and the second timer of each slave converter can function as the switching carrier timer as well. When the second timer of the slave converter is adjusted to be synchronized with the first timer of the host converter, the synchronization of the switching carrier timers of the host and slave converters is achieved.

In accordance with the method of the present invention, each converter may add an extra timer as its switching carrier timer, and both of the relationships between the first timer and the switching carrier timer of the host converter and between the second timer and the switching carrier timer of each slave converter follow a predetermined first protocol. The first protocol may set forth that the first timer of the host converter and its switching carrier timer maintain synchronized, and that the second timer and its switching carrier timer of the same slave converter also maintain synchronized. However, the first protocol may also set forth that the switching carrier timer of the host converter delays or advances a predetermined time from the first timer thereof, and the switching carrier timer of the slave converter delays or leads a predetermined time from the second timer thereof.

In accordance with the present invention, a second timer can be further added to the host converter, and a first timer can also be added to each of slave converters. Whilst the first and the second timers of the same converter maintain synchronization, and the relation of these two timers follows a second protocol. When the synchronization adjuster synchronizes the second timer of the slave converter with the first timer of the host converter, the first timer of the slave converter is also synchronized with the first timer of the host converter so as to realize the synchronization of the switching carrier timer of the host and slave converters.

In accordance with the present invention, when there are two timers in a converter, the second protocol will set the second timer at a continuous up or continuous down counting mode. If the first timer of the same converter is set as up/down counting mode, the period of the second timer thereof is twice as that of the first timer; and if the first timer of the same converter is set as continuous up or continuous down counting mode, the period of the second timer is the same as that of the first timer.

In accordance with the present invention, when there are two timers in a converter, the first timer of each converter can be used as the switching carrier timer of the same converter.

Application of the method of the present invention in a parallel UPS can effectively realize switching synchronization of the parallel-connected inverters, and suppressing the high frequency circulating current between the inverters.

The following is the detailed description of the embodiments of the present invention with the aid of the accompanying drawings.

DETAILED DESCRIPTION OF THE INVENTION

In order to realize the method of the present invention, it is necessary to set one of the converters of the parallel-connected converter system as a host converter, and the others are set as slave converters. In the converter system shown in FIGS. 4 and 5, each converter has two timers, a pulse-transmitting device, a pulse edge-capture device, and a synchronization adjuster. The first timer (Timer 1) of the two timers is connected to the synchronization bus through the pulse-transmitting device, and the second timer (Timer 2) is connected to the synchronization bus through the capture device.

Figure 4:
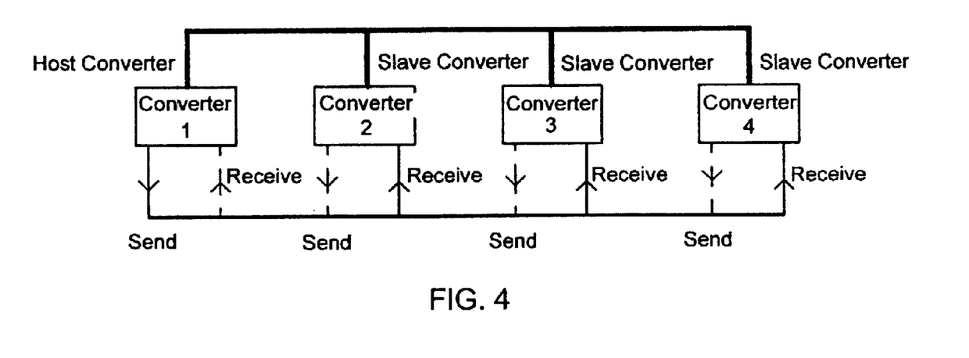
FIG. 4 is the illustrative diagram of the parallel-connected converter system of the present invention.
Figure 5:
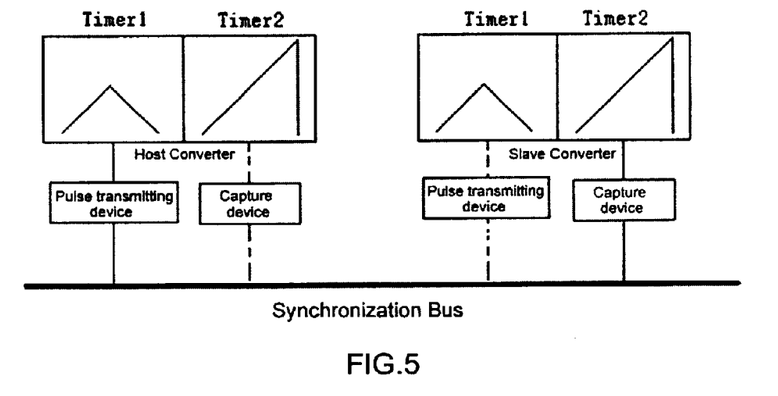
FIG. 5 is the illustration of connection of the timers, pulse-transmitting devices, pulse-capture devices, and synchronizing bus of the host and slave converters.

The period of the first timer (Timer 1) is Tp, and may be set as a up/down counting mode, and may also be set as a continuous up counting mode or continuous down counting mode.

Timer 1 of the host converter transmits synchronizing pulses toward the synchronization bus at a fixed or predetermined time Tk1, wherein the time Tk1 may bet set to the instant when the timer reaches zero or when the timer counts up to the predetermined period. The transmitting speed of the synchronization pulse may be fixed or adjustable. Usually for simplicity, the first timer (Timer 1) may also be used as a switching carrier timer for the same converter.

The present invention needs to set the second timer (Timer 2) of the same converter as a continuous up counting mode or continuous down counting mode. For simplicity, the first timer and the second timer maintain synchronized, that is, the first timer and the second timer start counting together, and may both count from zero; and it is also possible that one of the timer counts from zero, while the other timer starts counting from the maximum value. The period of Timer 2 depends on Timer 1. If Timer 1 is in up/down counting mode, the period of Timer 2 sets at 2 Tp; if Timer 1 is in continuous up counting or continuous down counting mode, the period of Timer 2 is the same as that of Timer 1, i.e., set as Tp.

As shown in FIG. 5, the capture device "CAPTURE" may detect the edge of the synchronization pulse (up or down edge), and records the corresponding counting number Tx of Timer 2. As seen in FIG. 5, the host converter transmits the synchronization pulse to the synchronization bus, and the slave converter receives the synchronization pulse from the synchronization bus.

Figure 6A:
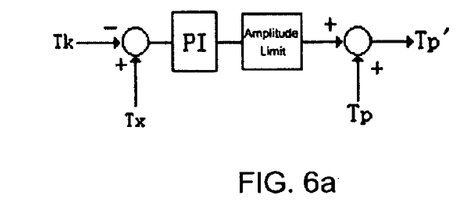
FIGS. 6a and 6b are the principle diagrams of PI synchronization adjuster and P synchronization adjuster of the present invention.
Figure 6B:
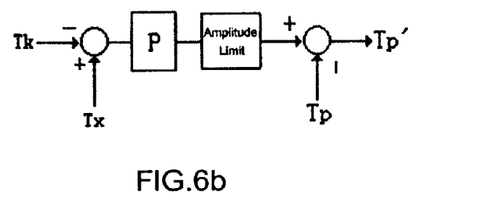

The synchronization algorithm controller is shown in FIG. 6. It calculates the time error between Tx and Tk1, i.e., $\Delta T = Tx - Tk1$. Using P adjustment, PI adjustment or other complicated adjustment, it adjusts slightly the carrier period Tp' of the slave converter on the basis of the basic timing period Tp, giving $Tp' = Tp + f(\Delta T)$. By slightly adjusting the period of the switching carrier of the slave converter, the synchronization of switching between the slave converter and the host converter is realized. The synchronization algorithm controller may vary with different settings of the second timer.

The first embodiment of the present invention is based on a parallel converter system, and its operation process is explained hereinafter.

Figure 7:
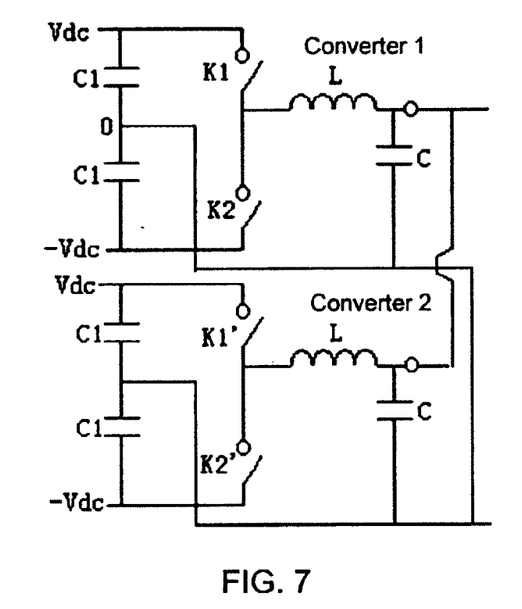
FIG. 7 is an illustration of the parallel converter system of the first embodiment of the present invention.

FIG. 7 illustrates a parallel system of two single-phase converters (or inverters), where the DC bus voltage is 2 Vdc. L is the filter inductance of the converter, C is the filter capacitance of the converter, and C1 is the filter capacitance of the bus. K1 and K2 are two switches of the converter 1, and K1' and K2' are two switches of the converter 2. To minimize the circulating current between the two converters, it is necessary to keep the switching of these two pairs of switches K1, K1', and K2, K2' synchronized.

Figure 8A:
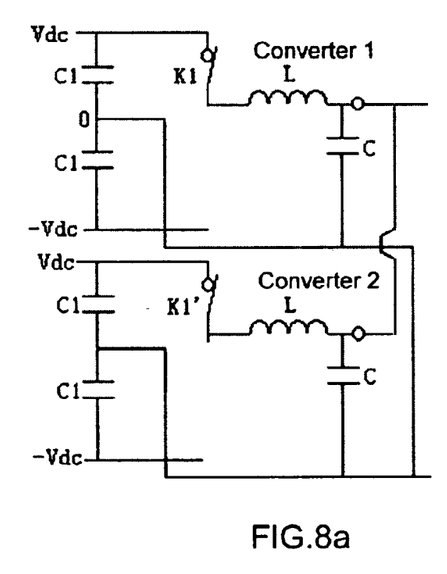
FIGS. 8a and 8b are, respectively, two possible states of the switches of the parallel converter system of the first embodiment of the present invention.
Figure 8B:
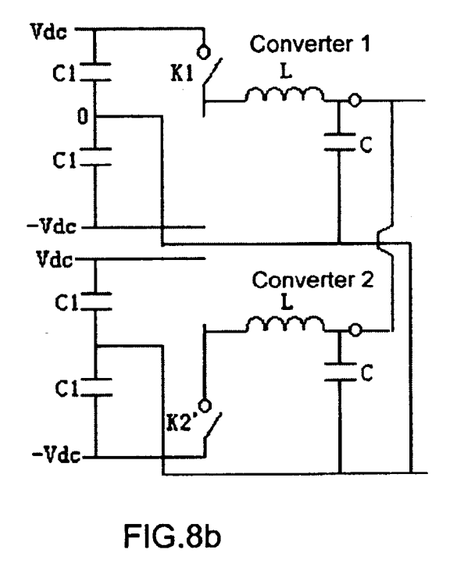

FIG. 8a shows the case when K1 and K1' operate consistently and K2 and K2' operate consistently. At this time, these two converters power the load simultaneously, and there is no high frequency current therebetween. FIG. 8b shows the case when K1 and K1', K2 and K2' do not operate consistently. At this time there is a voltage of 2 Vdc between the two filter inductances, whereby resulting in a relatively large high frequency circulating current between the two converters.

In the present embodiment, the first timer of each converter is used as switching carrier timer. If the synchronization of the first timer of every converter in the parallel converter system is realized, the synchronization of switching can be achieved.

In the parallel converter system, the first timer of each converter is set as continuous up/down counting mode, and the counting period is Tp. The second timer is set as continuous up counting mode, and the counting period is 2 Tp.

Figure 9:
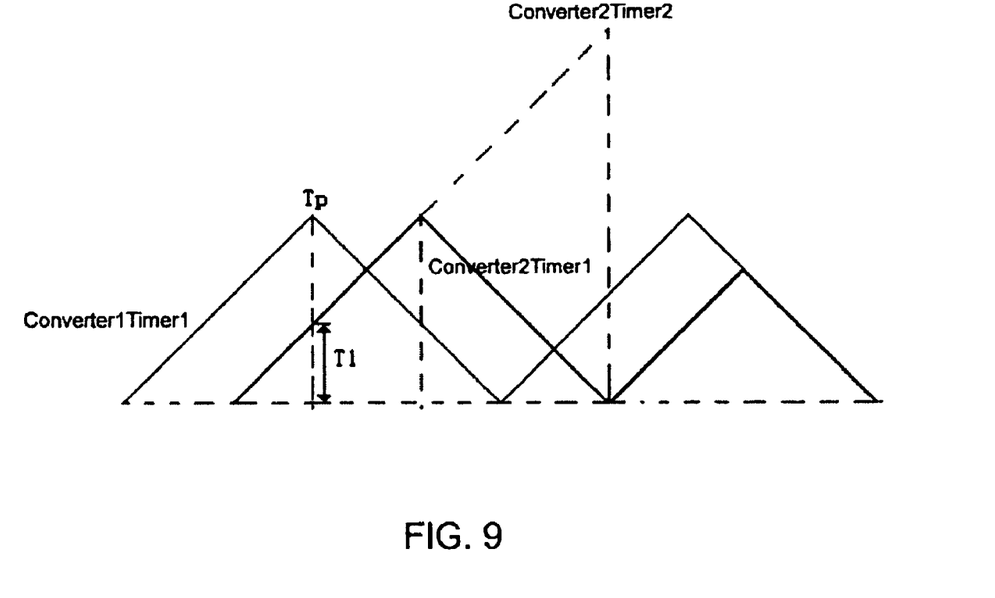
FIG. 9 illustrates the states of the timers during the synchronization of the host converter and the slave converters in the parallel converter system of the first embodiment of the present invention.

1. Generation of Synchronization Signal:

As shown in FIG. 9, the host converter 1 is illustrated with Timer 1, while the slave converter 2 is illustrated with Timer 1 and Timer 2 (Timer 2 identified as dotted lines), and Timer 1 and Timer 2 start counting from zero together. The ultimate goal of the present invention is to realize the synchronization of the Timer 1 of the host converter and Timer 1 of the slave converter at the next period after the synchronization control algorithm takes effect.

First, the pulse-transmitting device in the host converter transmits synchronization pulses to the synchronization bus with a fixed or variable period at the fixed predetermined time of Tk1=Tp.

2. Receipt of Synchronization Signal:

As shown in FIG. 9, the period of the second timers of all slave converters is 2 Tp, and all of slave converters capture the edge of the synchronization pulses from the synchronization bus, and record the time Tx=T1 of the second timers of the slave converters when the pulse edge arrives.

3. Synchronization Algorithm of Slave Converters:

All of the slave converters carry out the synchronization algorithm to adjust the periods of their switching carriers so as to realize the switching synchronization with the host converter. The adjustment procedure is as follows:
Calculate the time difference ΔT from Tx and Tk1.

$$\Delta T = Tx - Tk1 = T1 - Tp$$

On the basis of the predetermined period Tp the carrier period of the slave converter is slightly adjusted to Tp' by a P Regulator. In order to realize the carrier synchronization at the next switching period after the adjustment, it may take the coefficient of the ratio adjustment Kp as 0.5:

$$Tp' = Tp + Kp*\Delta T = TP + (T1-Tp)/2 = (T1+Tp)/2$$

As seen in FIG. 9, at the next switching period after the adjustment, the first timer of the slave converter may be synchronized with the first timer of the host converter so as to realize the synchronization of the switching carrier.

As an example of the parallel rectifier system of the second embodiment of the present invention, the operation thereof is described in detail hereinafter.

Figure 10:
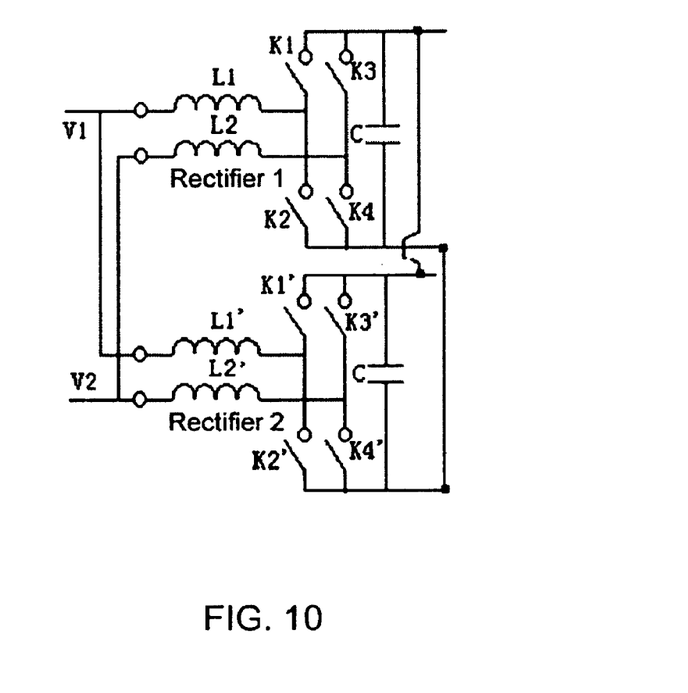
FIG. 10 is the illustration of a parallel rectifier system of the second embodiment of the present invention.

As shown in FIG. 10, in the parallel system of two single phase rectifiers, L1 and L2, L1' and L2' are, respectively, two rectifier inductances; K1, K2, K3, K4, and K1', K2', K3', K4' are, respectively, rectifier switches of the two rectifiers; and C is the filter capacitance. To reduce the energy flow between the two rectifiers, it is necessary to drive simultaneously the switches of the two rectifiers.

Figure 11A:
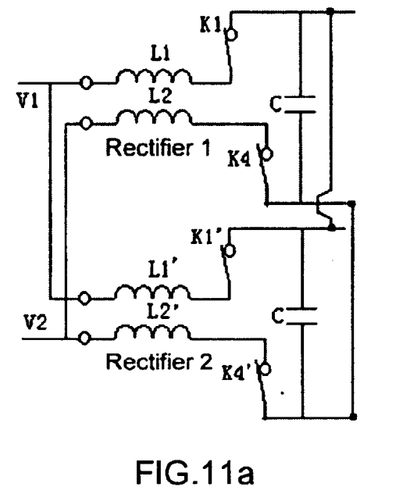
FIGS. 11a and 11b are, respectively, two possible states of the parallel rectifier switches of the second embodiment of the present invention.
Figure 11B:
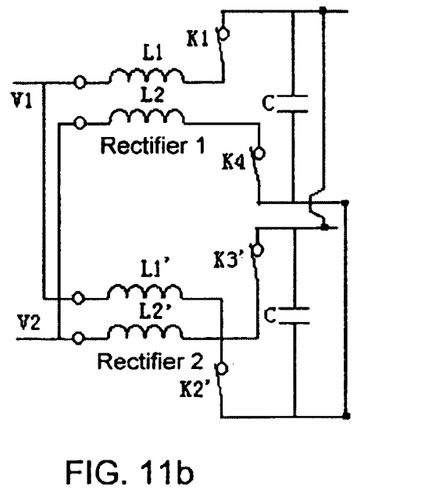

In FIG. 11a, K1 and K1', K4 and K4' are driven simultaneously such that there is no energy flow between the rectifiers. In FIG. 11b, K1 and K1', K4 and K4' are not synchronized such that there is an energy flow through K1 and K3' between the inductance L1 of the rectifier 1 and the inductance L2 of the rectifier 2, that is, the circulating current exists between the two rectifiers.

In the present embodiment, the first timer of each rectifier is used as switching carrier timer, and at the same time controls the time when the host rectifier transmits the synchronization pulses. Therefore, the realization of synchronization of the first timer of each rectifier may also realize the synchronization of their switches.

In the parallel rectifier system, the first timer of each converter is set as up/down counting mode, and the counting period is Tp. The second timer is set as a continuous down counting mode, and the counting period is 2 Tp.

Figure 12:
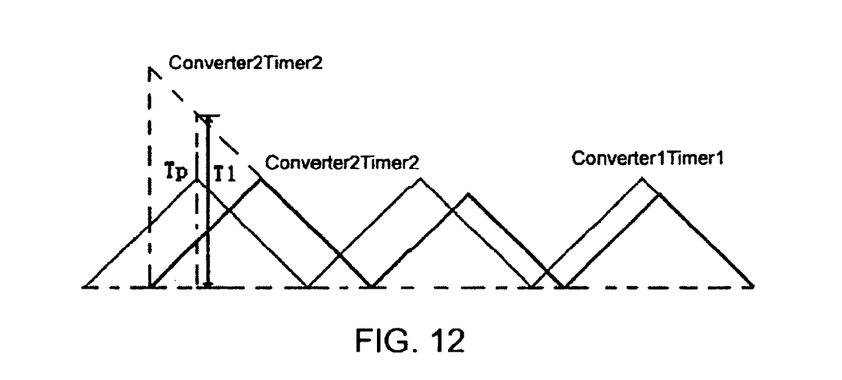
FIG. 12 shows the states of the timers during the synchronization of the host rectifier and the slave rectifiers.

1. Generation of Synchronization Signal:

As shown in FIG. 12, the host rectifier 1 is illustrated with Timer 1, while the slave rectifier 2 is illustrated with Timer 1 and Timer 2, and Timer 1 and Timer 2 thereof remain synchronized, wherein Timer 1 starts counting up from zero, and Timer 2 starts counting down from 2 XTp. The ultimate goal is to realize the synchronization of the Timer 1 of the host rectifier and Timer 1 of the slave rectifier at the next period after the synchronization control algorithm takes effect.

First, the pulse-transmitting device in the host rectifier transmits a synchronization pulse to the synchronization bus with a fixed or variable period at the fixed predetermined time of Tk1=Tp.

2. Receipt of Synchronization Signal:

As shown in FIG. 12, the period of the second timers of all slave rectifiers is 2 XTp, and all of slave rectifiers capture the edge information of the synchronization pulses from the synchronization bus, and record the time Tx=T1 of the second timers of the slave rectifiers when the pulse edge arrives.

3. Synchronization Algorithm of Slave Rectifiers:

All of the slave rectifiers carry out the synchronization algorithm to adjust the period of the switching carriers so as to realize the switching synchronization with the host rectifier. The adjustment procedure is as follows:
Calculate the difference ΔT from Tx and Tk1.

$$\Delta T = Tx - Tk1 = T1 - Tp$$

On the basis of the predetermined period Tp of the carrier, the carrier period of the slave rectifier is slightly adjusted to Tp' by P regulator. In order to realize the carrier synchronization of the next switching period after the adjustment, it may take the coefficient of the ratio adjustment Kp as 0.25:

$$Tp' = Tp + Kp*\Delta T = TP + (T1+Tp)/4 = (5*Tp-T1)/4$$

As seen in FIG. 12, the second timers of the slave rectifier may realize synchronization at the next two periods after the adjustment so as to realize the synchronization of the switching carrier.

In the above embodiments, each of the converters or rectifiers is provided with two timers. In fact, the synchronization may also be realized even if only one timer is provided in each converter. With reference to the parallel converter system shown in FIG. 7, the operation of the present invention is explained in detail in case each converter has only one timer. That is to say there is only the first timer in the host converter, and the slave converter only contains a second timer.

The first timer of the host converter sends the synchronization pulse through the pulse-transmitting device, and is used as the switching carrier timer of the host converter at the same time. The second timer of the slave converter is also used as a switching carrier timer of the slave converter. If an algorithm realizes the synchronization of the second timer of the slave converter with the first timer of the host converter, it realizes the switching synchronization.

Wherein the pulse capturing device uses the second timer of the slave converter to capture the time of the pulse edge from the synchronization bus. The timer of each converter is set at continuous up counting mode, and the counting period thereof is fixed at Tp.

Figure 13:
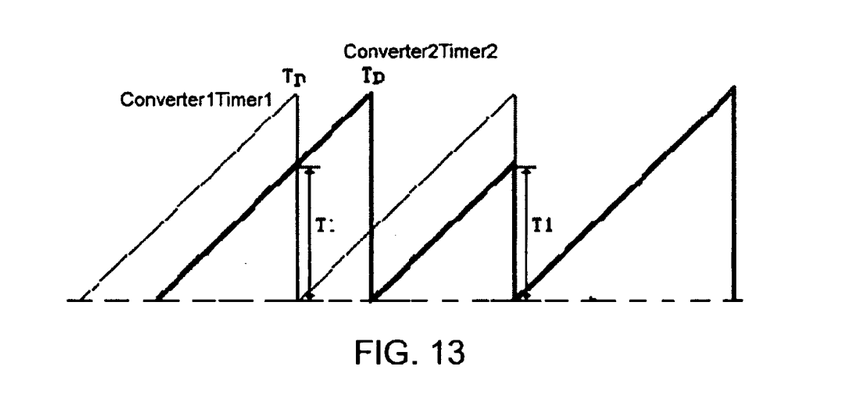
FIG. 13 illustrates the states of synchronization when each converter has only one timer in the third embodiment of the present invention.

1. Generation of Synchronization Signal:

As shown in FIG. 13, the pulse-transmitting device in the host converter 1 transmits the synchronization pulses to the synchronization bus with a fixed or variable period at the fixed time Tk1=Tp of the first timer.

2. Receipt of Synchronization Signal:

As shown in FIG. 13, the slave converter 2 uses the capture device to capture the edge information of the synchronization pulses from the synchronization bus, and record the time Tx=T1 of the second timer of the slave converter when the pulse edge arrives.

3. Synchronization Algorithm of Slave Converters:

The slave converter 2 carries out the synchronization algorithm to adjust the period of the switching carrier so as to realize the switching synchronization with the host converter. The adjustment procedure is as follows:

Calculate difference $\Delta T$ from the time Tx and Tk1.

$$\Delta T = Tx - Tk1 = T1 - Tp$$

On the basis of the predetermined period Tp of the carrier, the carrier period of the slave converter is slightly adjusted to Tp' by P regulator. In order to realize the carrier synchronization at the next switching period after the adjustment, it may take the coefficient of the ratio adjustment Kp as 1:

$$Tp' = Tp + Kp^*\Delta T = Tp + (T1 - Tp) = T1$$

As seen in FIG. 13, the second timer of the slave converter may realize synchronization at the next period after the adjustment.

The method of the present invention is not limited to the aforesaid embodiments. For instance, in the third embodiment, it may add one more timer in each converter as the switching carrier timer of the converter. The relationship between first timer of the host converter and the switching carrier timer and between the second timer of the slave converter and the switching carrier timer obeys the predetermined first protocol. The first protocol may provide that the first timer of the host converter and its switching carrier maintain synchronized, and that the second timer and the switching carrier timer of the same slave converter maintain synchronized. It may also provide that the switching carrier timer of the host converter advances or delays the first timer for a fixed time; and the switching carrier timer of a slave converter advances or delays the second timer of the same converter for a fixed time.

What we claim is:

1. A switching synchronization method for a parallel converter system having a plurality of converters parallel connected through a synchronizing signal bus, comprising setting one of the converters as a host converter, and setting the others as slave converters, wherein said host converter includes at least a first timer and a pulse transmitting device, and each of said slave converters includes at least a second timer, a pulse edge capture device as well as a synchronization adjuster, said converter system carrying out the following steps to synchronize switches:

(1) the first timer of the host converter being used to send synchronization pulses to the synchronization bus at a predetermined time (Tk1) through said pulse transmitting device;

(2) the second timer of each of the slave converters recording the time (Tx) of the edge of the synchronization pulse received by said capture device from the synchronization bus; and (3) on the basis of said times Tk1 and Tx said synchronization adjuster calculating the synchronization algorithm, adjusting the second timer in said slave converters to be synchronized with the first timer of the host converter, and then according to a predetermined protocol, the switching carrier timer in each of the slave converters being adjusted to synchronize with a switching carrier timer of the host converter.

2. The method of claim 1, wherein the first timer of the host converter is also used as the switching carrier timer of the host converter; and the second timer of the slave converter is also used as the switching carrier system of that slave converter.

3. The method of claim 1, wherein a separate timer is used, respectively, in said host converter and in each of said slave converters to serve as the switching carrier timer, and the relationship between the first timer and the switching carrier timer of the host converter and the relationship between the second time and the switching carrier timer of each of said slave converters obey a predetermined first protocol.

4. The method of claim 3, wherein said first protocol sets forth the first timer and switching carrier timer of the host converter remain synchronized; and the second timer and switching carrier timer of the same slave converter remain synchronized.

5. The method of claim 3, wherein said first protocol sets forth the switching carrier timer of the host converter advances or delays the first timer thereof for a predetermined time; and the switching carrier timer of the same slave converter advances or delays the second timer thereof for a predetermined of the slave converter.

6. The method of claim 1, wherein a second timer is provided in said host converter, and a first timer is provided in each of said slave converters, whereas the first timer and second timer of the same converter remain synchronized, and the relationship between the two timers of the same converter obeys a second protocol.

7. The method of claim 6, wherein said second protocol sets forth that the second timer of each converter as continuous counting mode, and if in the same converter the first timer is set as up/down counting mode, the period of the second timer is set twice as the period of the first timer; and if in the same converter the first timer is set as continuous up counting mode or continuous down counting mode, the period of the second timer is the same as the period of the first timer.

8. The method of claim 6, wherein the first timer of each converter is also used as the switching carrier timer of the converter.

9. The method of claim 1, wherein said slave converter carries out a synchronization algorithm: $Tp' = Tp + f(\Delta T)$, wherein Tp is the cycle of the switching carrier timer, Tp' is the cycle of the switching carrier timer after slight adjustment, $\Delta T=Tx-Tk1$, and $f(0)=0$.

10. The method of claim 9, wherein $f(\Delta T)$ is PI adjustment or P adjustment.

11. The method of claim 2, wherein said slave converter carries out a synchronization algorithm: $Tp'=Tp+f(\Delta T)$, wherein Tp is the cycle of the switching carrier time, Tp' is the cycle of the switching carrier timer after slight adjustment, $\Delta T=Tx-Tk1$, and $f(0)=0$.

12. The method of claim 3, wherein said slave converter carries out a synchronization algorithm: $Tp'=Tp+f(\Delta T)$, wherein Tp is the cycle of the switching carrier time) Tp' is the cycle of the switching carrier timer after slight adjustment, $\Delta T=Tx-Tk1$, and $f(0)=0$.

13. The method of claim 4, wherein said slave converter carries out a synchronization algorithm: $Tp'=Tp+f(\Delta T)$, wherein Tp is the cycle of the switching carrier time, Tp' is the cycle of the switching carrier timer after slight adjustment, $\Delta T=Tx-Tk1$, and $f(0)=0$.

14. The method of claim 5, wherein said slave converter carries out a synchronization algorithm: $Tp'=Tp+f(\Delta T)$, wherein Tp is the cycle of the switching carrier time, Tp' is the cycle of the switching carrier timer after slight adjustment, $\Delta T=Tx-Tk1$, and $f(0)=0$.

15. The method of claim 6, wherein said slave converter carries out a synchronization algorithm: $Tp'=Tp+f(\Delta T)$, wherein Tp is the cycle of the switching carrier time, Tp' is the cycle of the switching carrier timer after slight adjustment, $\Delta T=Tx-Tk1$, and $f(0)=0$.

16. The method of claim 7, wherein said slave converter carries out a synchronization algorithm: $Tp'=Tp+f(\Delta T)$, wherein Tp is the cycle of the switching carrier time, Tp' is the cycle of the switching carrier timer after slight adjustment, $\Delta T=Tx-Tk1$, and $f(0)=0$.

17. The method of claim 8, wherein said slave converter carries out a synchronization algorithm: $Tp'=Tp+f(\Delta T)$, wherein Tp is the cycle of the switching carrier time, Tp' is the cycle of the switching carrier timer after slight adjustment, $\Delta T=Tx-Tk1$, and $f(0)=0$.

* * * * *